US012194479B2

(12) United States Patent
Yamamoto et al.

(10) Patent No.: US 12,194,479 B2
(45) Date of Patent: Jan. 14, 2025

(54) ROTOR WITH STRESS RELAXATION GROOVE, AND CENTRIFUGE USING ROTOR WITH STRESS RELAXATION GROOVE

(71) Applicant: Eppendorf Himac Technologies Co., Ltd., Ibaraki (JP)

(72) Inventors: Takuya Yamamoto, Ibaraki (JP); Jun Sato, Ibaraki (JP)

(73) Assignee: Eppendorf Himac Technologies Co., Ltd., Ibaraki (JP)

( * ) Notice: Subject to any disclaimer, the term of this patent is extended or adjusted under 35 U.S.C. 154(b) by 716 days.

(21) Appl. No.: 17/442,127

(22) PCT Filed: Sep. 30, 2020

(86) PCT No.: PCT/JP2020/037344
§ 371 (c)(1),
(2) Date: Sep. 22, 2021

(87) PCT Pub. No.: WO2021/100333
PCT Pub. Date: May 27, 2021

(65) Prior Publication Data

US 2022/0168755 A1 Jun. 2, 2022

(30) Foreign Application Priority Data

Nov. 21, 2019 (JP) ................................ 2019-210149

(51) Int. Cl.
*B04B 5/12* (2006.01)
*B04B 1/04* (2006.01)
(Continued)

(52) U.S. Cl.
CPC .................. *B04B 5/12* (2013.01); *B04B 1/04* (2013.01); *B04B 7/02* (2013.01); *B04B 11/02* (2013.01); *B04B 2005/125* (2013.01)

(58) Field of Classification Search
CPC .... B04B 5/12; B04B 1/04; B04B 7/02; B04B 11/02; B04B 2005/125; B04B 7/08; B04B 2005/0464; B04B 5/0442; B04B 7/00
See application file for complete search history.

(56) References Cited

U.S. PATENT DOCUMENTS 4,822,330 A 4/1989 Penhasi
6,713,028 B1 3/2004 Oklejas, Jr.

FOREIGN PATENT DOCUMENTS

CN 1094658 11/1994
DE 202005007162 9/2006

(Continued)

OTHER PUBLICATIONS

"Office Action of China Counterpart Application" with English translation thereof, issued on Sep. 1, 2022, p. 1-p. 11.

(Continued)

*Primary Examiner* — Walter D. Griffin
*Assistant Examiner* — Shuyi S. Liu
(74) *Attorney, Agent, or Firm* — JCIPRNET

(57) ABSTRACT

When this centrifuge is operated, local stress applied to a liquid-feeding groove formed in the upper surface of a rotor core is averaged to minimize deformation of the rotor core. A rotor core, which is mounted inside a rotor used for continuous centrifugation, has a columnar solid section, blades expanding radially outward from the solid section, and a disc section extending radially outward from the upper surface of the solid section, the upper surface of the rotor core being provided with a liquid-feeding grove that continues radially outward from the center vicinity to the outer side. A stress-mitigating groove that extends radially outward is formed in the lower surface of the liquid-feeding grove. The stress-mitigating groove is formed in a position (Continued)

overlapping the position of the liquid-feeding grove when the disc section is viewed along the axial direction.

20 Claims, 11 Drawing Sheets

(51) Int. Cl.
*B04B 7/02* (2006.01)
*B04B 11/02* (2006.01)

(56) References Cited

FOREIGN PATENT DOCUMENTS

| | | |
|---|---|---|
| JP | S58-116061 | 8/1983 |
| JP | S60-119946 | 8/1985 |
| JP | S60-128748 | 8/1985 |
| JP | 2010082567 | 4/2010 |
| JP | 2017131873 | 8/2017 |

OTHER PUBLICATIONS

"International Search Report (Form PCT/ISA/210) of PCT/JP2020/037344", mailed on Nov. 24, 2020, with English translation thereof, pp. 1-4.

sample injection (32,000 rpm)

(A)

(B)

sample collection (3,000 rpm)

(A)

(B)

(A)

(B)

(A)

(B)

ROTOR WITH STRESS RELAXATION GROOVE, AND CENTRIFUGE USING ROTOR WITH STRESS RELAXATION GROOVE

CROSS-REFERENCE TO RELATED APPLICATION

This application is a 371 application of the International PCT application serial no. PCT/JP2020/037344, filed on Sep. 30, 2020, which claims the priority benefits of Japan Patent Application No. 2019-210149, filed on Nov. 21, 2019. The entirety of each of the above-mentioned patent applications is hereby incorporated by reference herein and made a part of this specification.

BACKGROUND

Technical Field

The present invention relates to a rotor for centrifuge that injects a sample from the outside of a device during rotation of the rotor and collects a centrifuged sample outside the device during the rotation of the rotor, and relates to a centrifuge using the same.

Related Art

A centrifugal separator houses, inside a rotor chamber (rotating chamber), a rotor (rotating body) that holds a sample to be separated, and rotates the rotor at a high speed using a drive device such as a motor or the like in a state that an opening portion of the rotor chamber is sealed by a door, thereby performing separation and purification of the sample held in the rotor, or other operations. In normal use, when the rotation of the rotor is stopped, the sample to be separated is put in a sample container and held by the rotor, and the rotor is rotated by the drive device after the door of the rotor chamber is closed. When the centrifugal separation operation is completed, the rotation of the rotor is stopped, the door is opened, and then the sample container is taken out.

As another centrifugal separation method, a method using a so-called continuous rotor is used in the fields of medicine, pharmacy, and the like, and in this method, a sample is separated by being continuously and directly poured into a rotor from the outside of a centrifuge body via a tube. Examples of the structure of the continuous rotor are shown in, for example, Patent literature 1 and Patent literature 2. When the continuous rotor is used, a sample container containing a sample is arranged outside a centrifugal separator body, a sample flow path is formed by a tube extending from the container to the rotor arranged in a rotor chamber of the centrifugal separator body, and the sample to be separated is continuously poured from the sample container into the rotor while the rotor is rotated.

In the centrifugal separator in which the continuous rotor is used, in order to introduce a sample tube from the outside of the centrifuge body into the rotor chamber, an adapter is arranged on the door that separates the inside and outside of the rotor chamber. The adapter allows a liquid such as a density gradient liquid, a sample, or the like to be injected into and discharged from the internal space of the rotor from the vicinity of an axial center on the upper side of the rotating rotor. The rotor has various shapes, such as a bowl shape having a lid (rotor cover), and a member called a rotor core is mounted in the internal space so that the liquid to be injected and discharged flows in a predetermined direction. The rotor core also has various shapes. In one example, the upper surface of the rotor core is brought into close contact with the rotor cover, and several grooves for feeding the density gradient liquid which extend radially outward from the vicinity of the central axis center are formed in the upper surface.

LITERATURE OF RELATED ART

Patent Literature

Patent literature 1: Japanese Utility Model Laid-Open No. 60-119946

Patent literature 2: Japanese Patent Laid-Open No. 2010-82567

SUMMARY

Problems to be Solved

Because the rotor core used in the continuous rotor is arranged inside the rotor and is rotated at a high speed in a state that the internal space of the rotor is filled with a liquid such as the density gradient liquid, the sample, or the like, a stress caused by a hydraulic pressure generated by the centrifugal separation is concentrated on a specific site of a groove portion formed in the rotor core, for example, the liquid feeding groove formed radially in the upper surface. This stress acts in a direction in which the vicinity of the groove portion of the rotor core is deformed, and thus the rotor core is required to have a sufficient strength to cope with the stress. Besides, in addition to strength, it is important that the rotor core has a sufficient service life to withstand repeat use.

The present invention has been completed in view of the above background, and the object is to provide a rotor for centrifuge that suppresses deformation of a rotor core by averaging a stress which is applied locally by a hydraulic pressure applied to a liquid feeding groove formed in the upper surface of the rotor core, and to provide a centrifuge using the rotor for centrifuge.

Another object of the present invention is to provide a rotor for centrifuge that has a sufficient margin in service life by suppressing deformation of a rotor core, and a centrifuge using the rotor for centrifuge.

Means to Solve Problems

Typical features of the invention disclosed in the present application are described as follows.

According to one feature of the present invention, a rotor for centrifuge which is rotated by a driving source has a rotor body that has a recess formed inside, a rotor core arranged in the recess, and a rotor cover for closing an opening of the rotor body. The rotor core has: a columnar solid portion; a disc portion extending radially outward from an upper surface of the solid portion; a liquid feeding groove located in an upper surface of the rotor core and formed in a manner of being continuous from the solid portion to the disc portion; and a liquid feeding hole formed in a manner of extending downward from the upper surface of the solid portion and further extend in a radial direction. A stress relaxation groove is formed in a lower surface of the disc portion. The rotor core is an integral piece made of resin or metal, and an upper opening portion of the liquid feeding groove is closed by contacting an inner lower wall of the rotor cover. The stress relaxation groove is arranged at a portion that partially overlaps the position of the liquid feeding groove when the disc portion is seen through in an axis line direction. Furthermore, the stress relaxation groove is a groove extending in a straight line in the radial direction from an inner peripheral side to an outer peripheral side in the lower surface of the disc portion, and is formed so that an end portion on the outer peripheral side reaches an outer edge portion of the disc portion.

According to another feature of the present invention, a plurality of the liquid feeding grooves are formed at equal intervals in a circumferential direction, and the stress relaxation groove is formed in a manner of corresponding to each of the plurality of liquid feeding grooves. For example, the liquid feeding groove has a U-shaped cross section orthogonal to an extending direction, and the stress relaxation groove has a rectangular, U-shaped, or V-shaped cross section orthogonal to the extending direction. In addition, a depth $D_2$ of the stress relaxation groove satisfies $D_1+D_2<T$, in which a thickness of the disc portion is T, and a depth of the liquid feeding groove is $D_1$. In this way, a plurality of the stress relaxation grooves are formed in a distributed manner in the circumferential direction or the radial direction with respect to each of the liquid feeding grooves. Furthermore, blades extending radially outward from an outer peripheral surface of the solid portion are further arranged. These blades have a vertical plate shape connected to the disc portion, and the solid portion and the blade are formed integrally or separately.

According to still another feature of the present invention, a columnar protrusion protruding axially upward is formed at an axial center of the upper surface of the solid portion. The liquid feeding groove is constituted of four axial groove portions extending downward in an outer peripheral surface of the protrusion and a radial groove portion extending radially outward with respect to the solid portion from the lower end of the axial groove portion. In addition, the liquid feeding hole has a first liquid feeding hole that has an upper opening at the axial center of the upper surface of the protrusion, extends downward in the axis line direction and outward in the radial direction in the middle, and opens in the vicinity of the lower surface of the disc portion on the outer peripheral surface of the solid portion, and a second liquid feeding hole that has an opening at a position adjacent to the outer side in the radial direction from the upper opening of the first liquid feeding hole, extends downward in the axis line direction and outward in the radial direction in the middle, and has an opening in the outer peripheral surface of the solid portion. A centrifuge is configured using the rotor for centrifuge configured as above, a door adapter that is mounted on the rotor cover and has a through hole through which a flow path that supplies and discharges a liquid to and from the recess passes, a bowl that defines a rotor chamber in which the rotor for centrifuge rotates; and a housing for holding the driving source and the bowl.

Effect

According to the present invention, in the lower surface of the disc portion of the rotor core extending in the radial direction, the stress relaxation groove is formed at a position that partially overlaps the position of the liquid feeding groove, and thus concentration of stress that is applied locally can be relaxed by the liquid feeding groove formed in the upper surface of the rotor core, the deformation of the rotor core during high speed rotation can be suppressed, and the service life of the rotor core can be extended.

Figure 4:
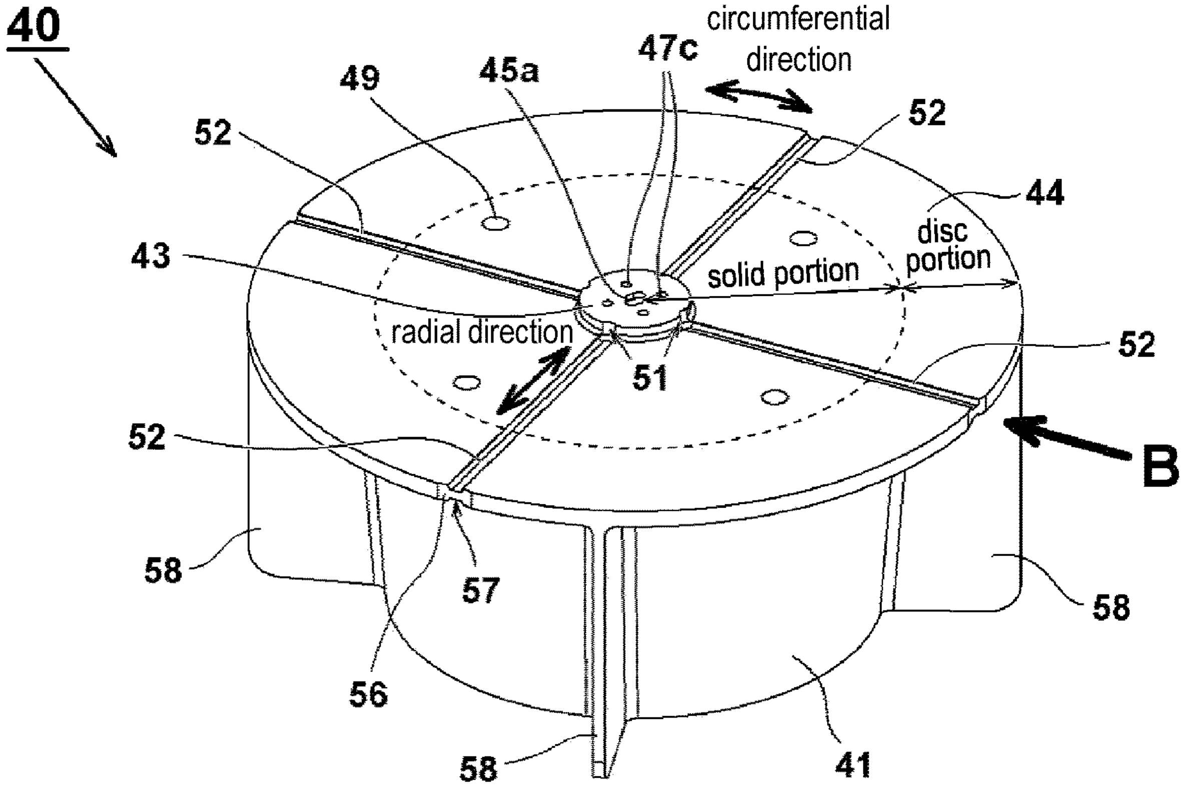
FIG. 4 is a perspective view of the rotor core 40 of FIG. 2 when viewed obliquely from above.
Figure 5:
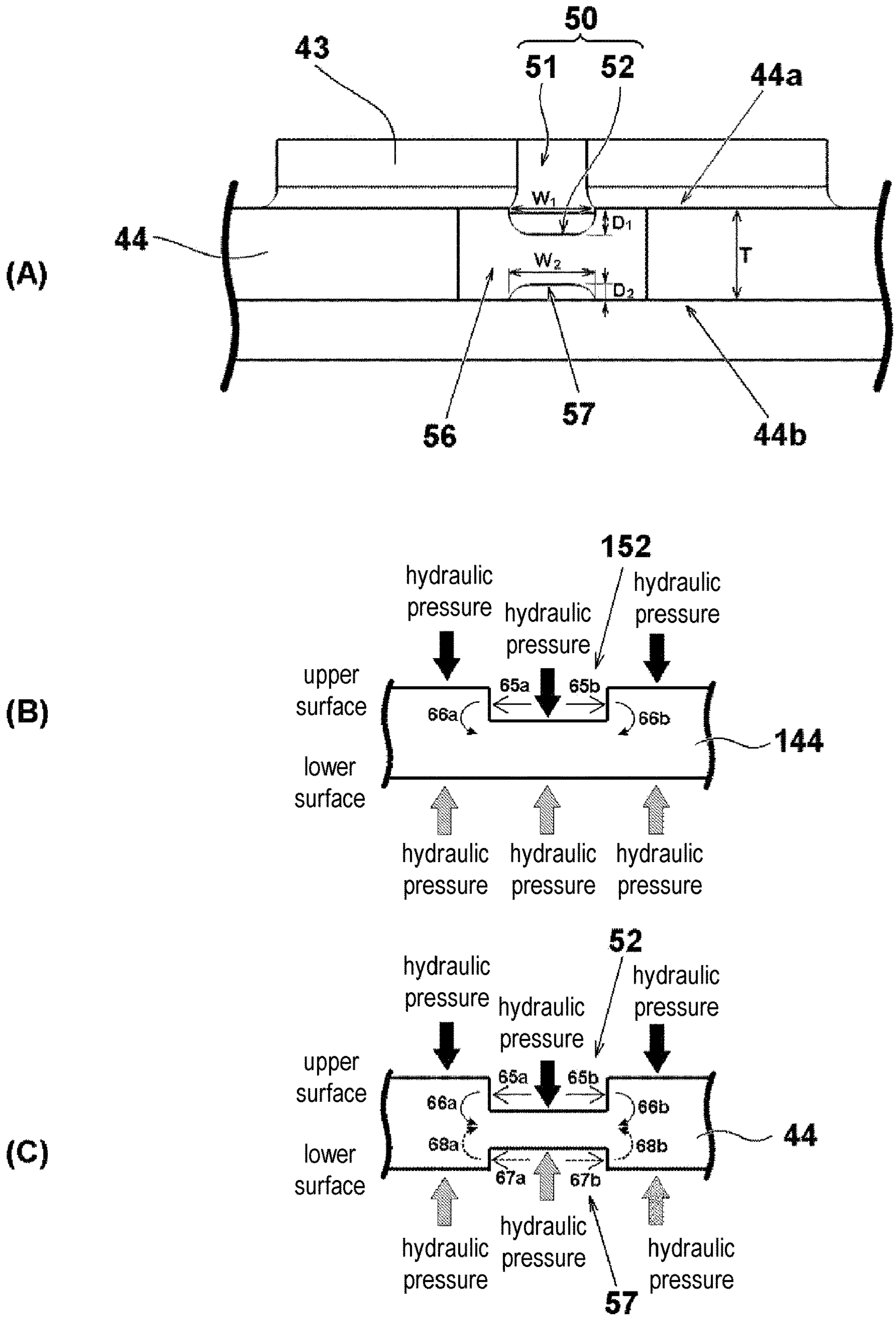

(A) of FIG. 5 is a partial side view of a disc portion 44 of the rotor core 40 when viewed from a portion B of FIG. 4, and (B) of FIG. 5 and (C) of FIG. 5 are partial cross-sectional views for illustrating stress of liquid feeding grooves 152 and 52.

Figure 6:
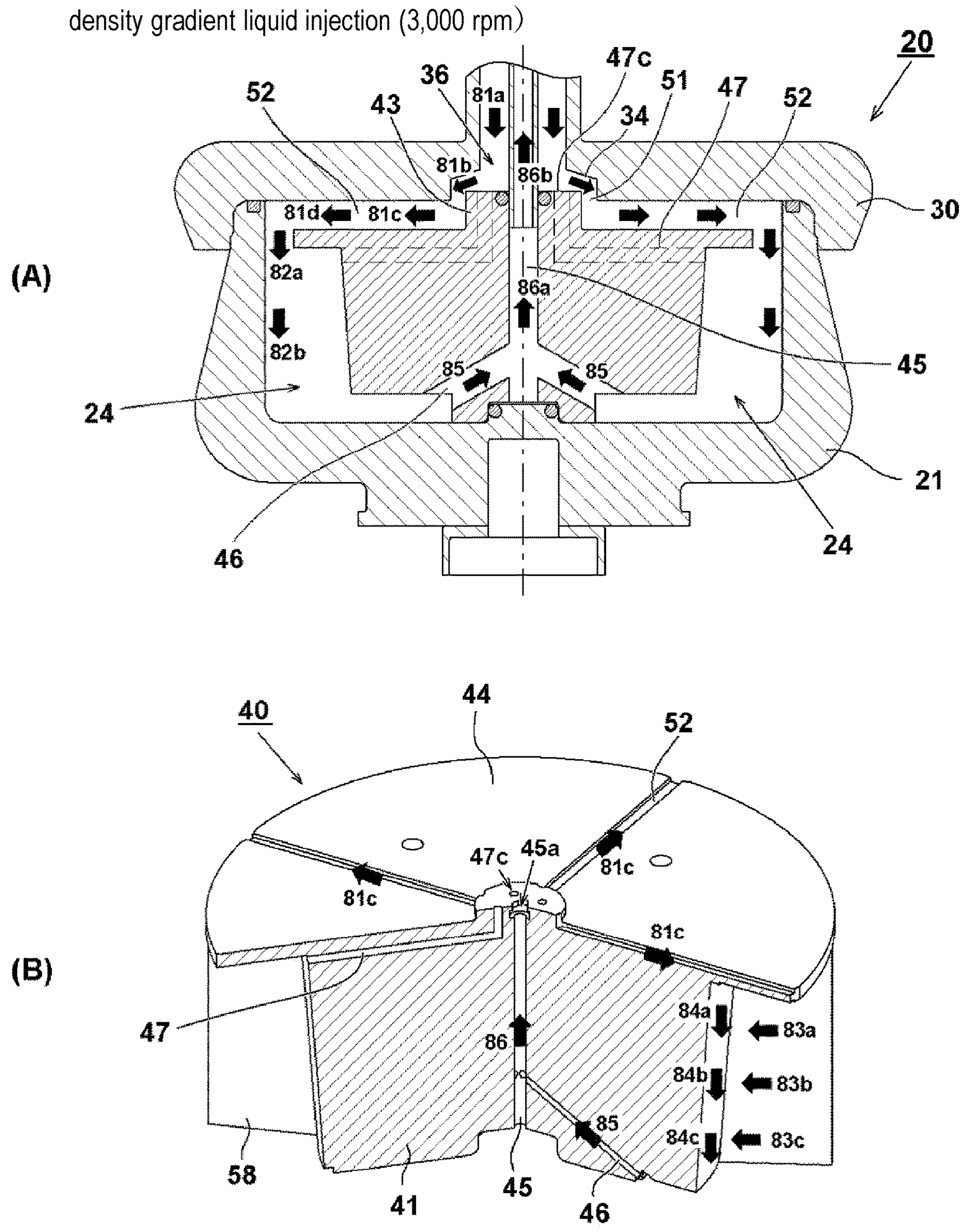

FIG. 6 is a schematic view of the rotor 20 for illustrating a liquid feeding state of a density gradient liquid during a centrifugal separation operation.

Figure 7:
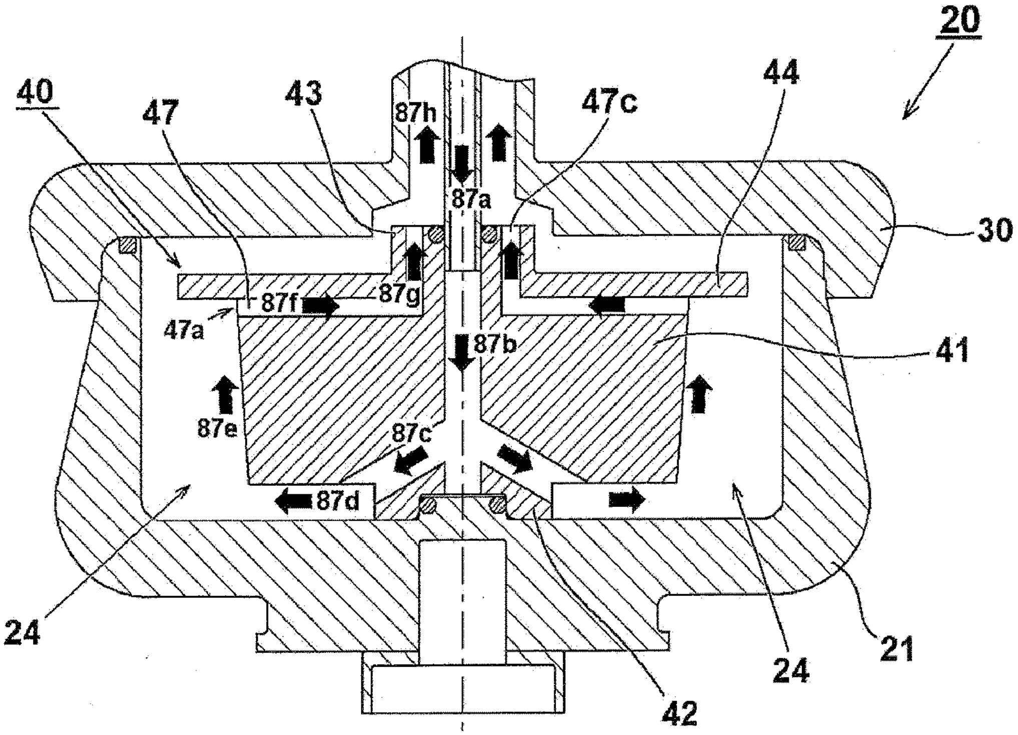
Figure 7:
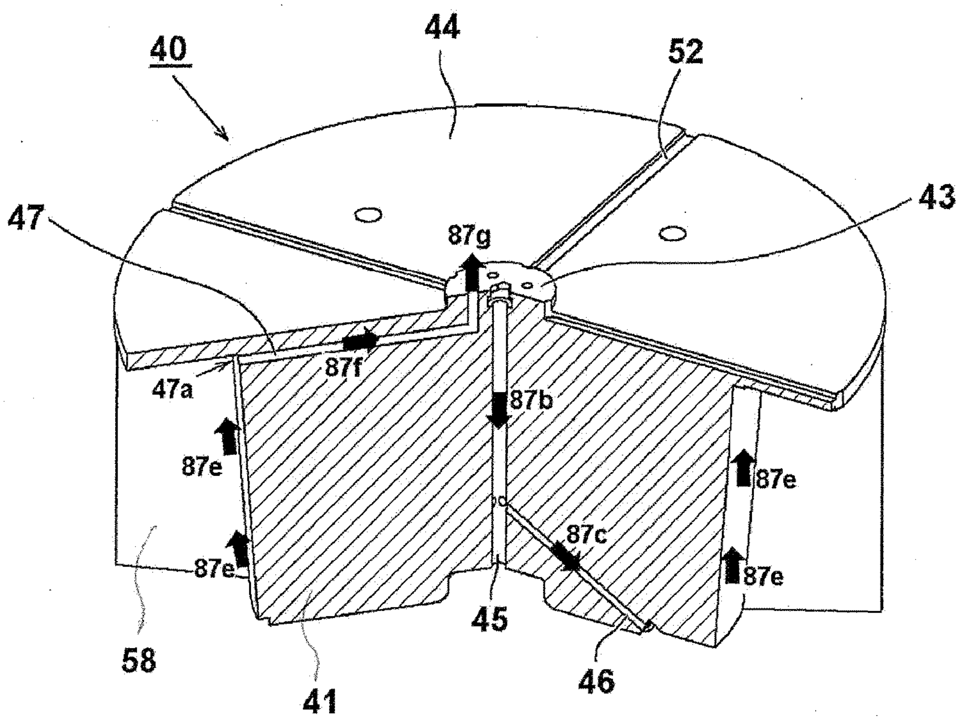

FIG. 7 is a schematic view of the rotor 20 for illustrating a liquid feeding state of a sample during the centrifugal separation operation.

Figure 8:
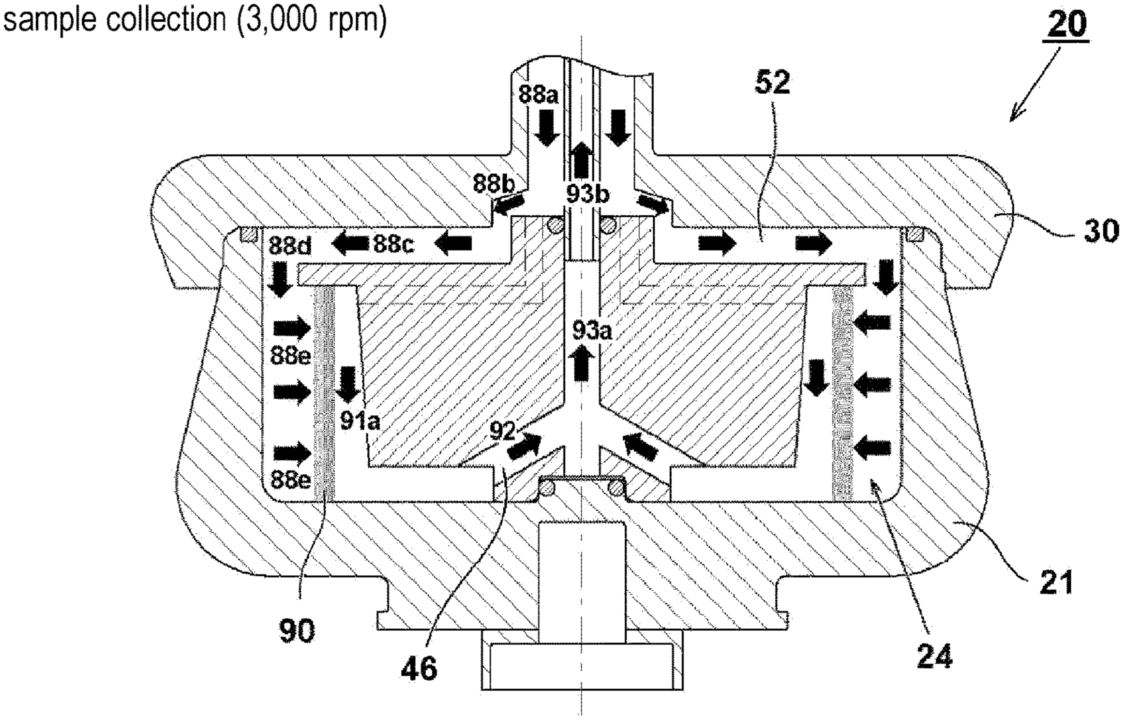
Figure 8:
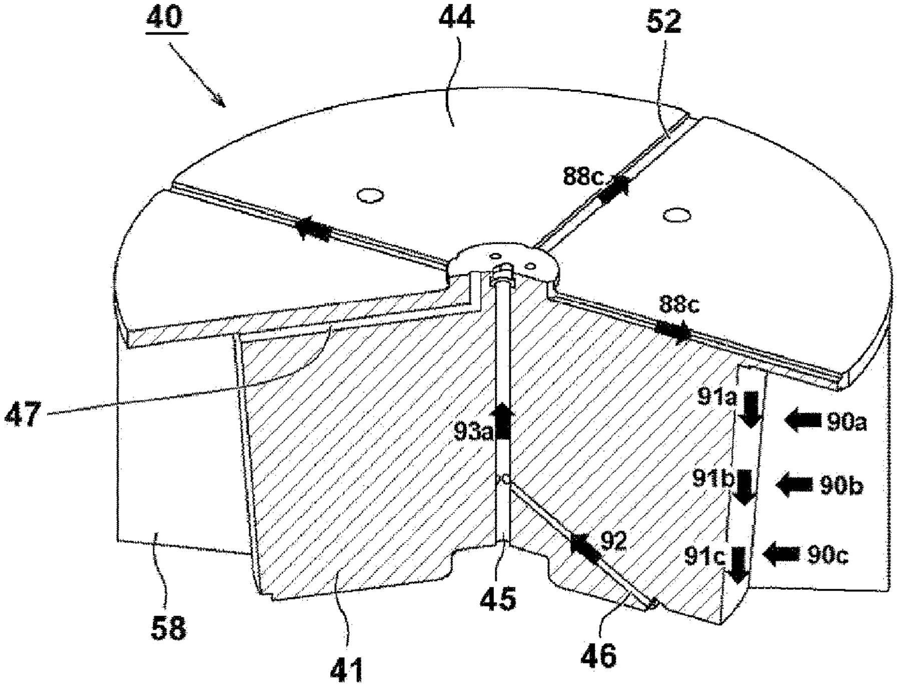

FIG. 8 is a schematic view of the rotor 20 for illustrating a discharge state of a separated sample during the centrifugal separation operation.

Figure 9:
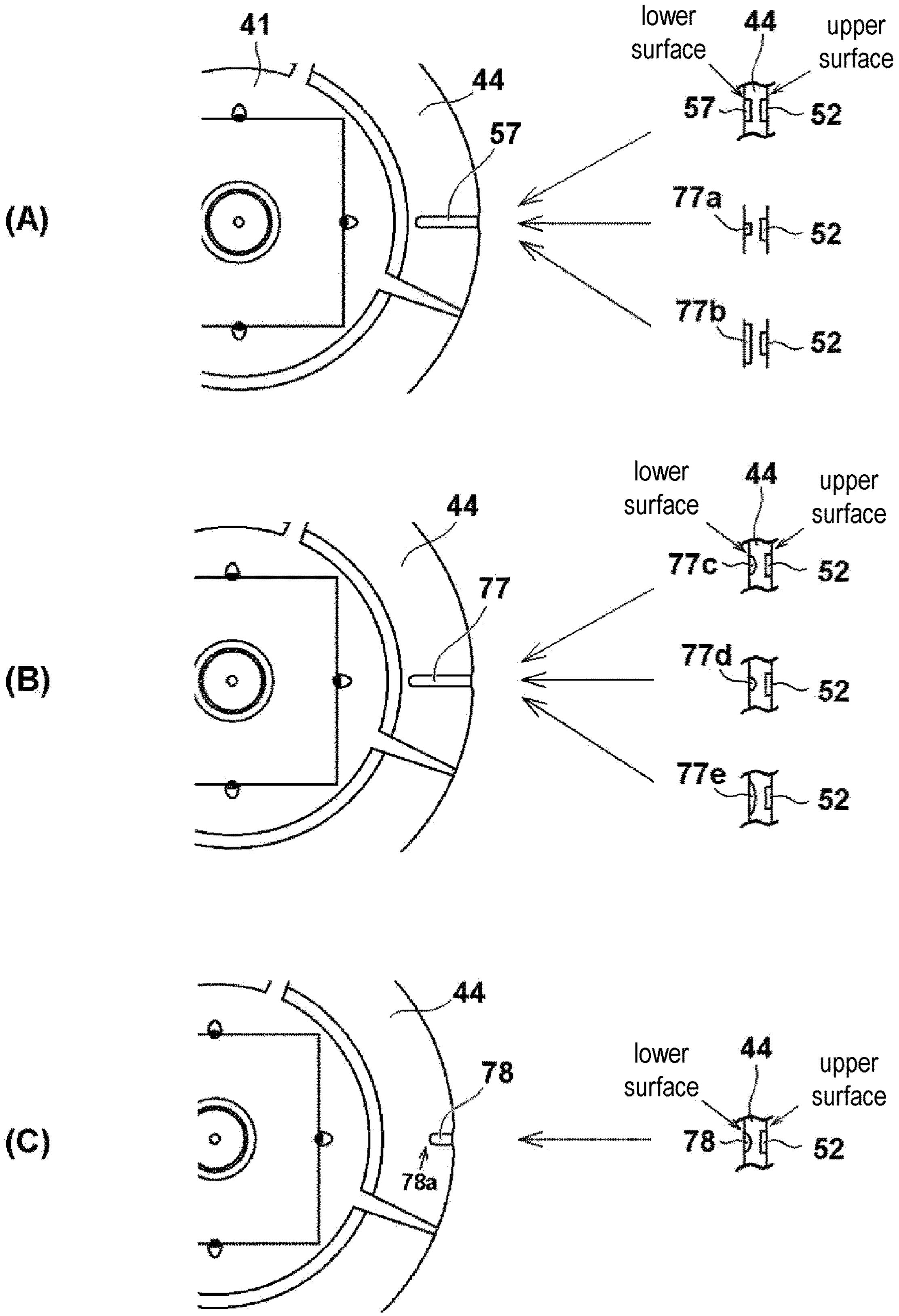

FIG. 9 shows a partial top view and a partial side view for illustrating a liquid feeding groove according to a variation example of the embodiment.

Figure 10:
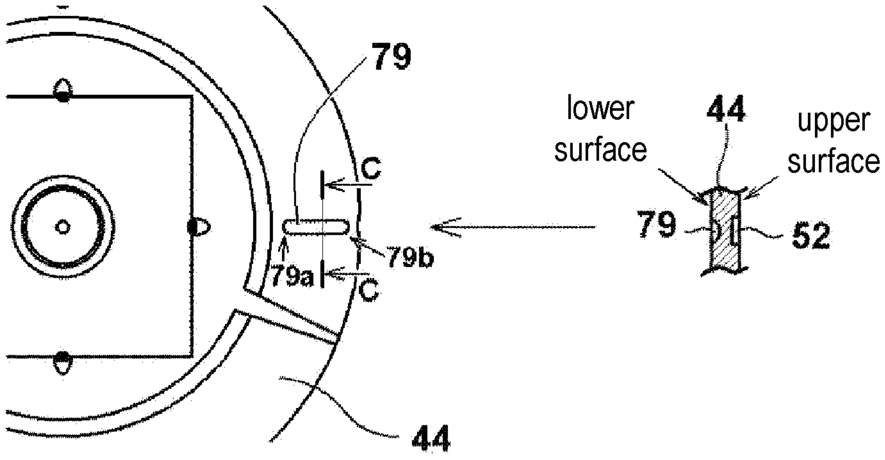
Figure 10:
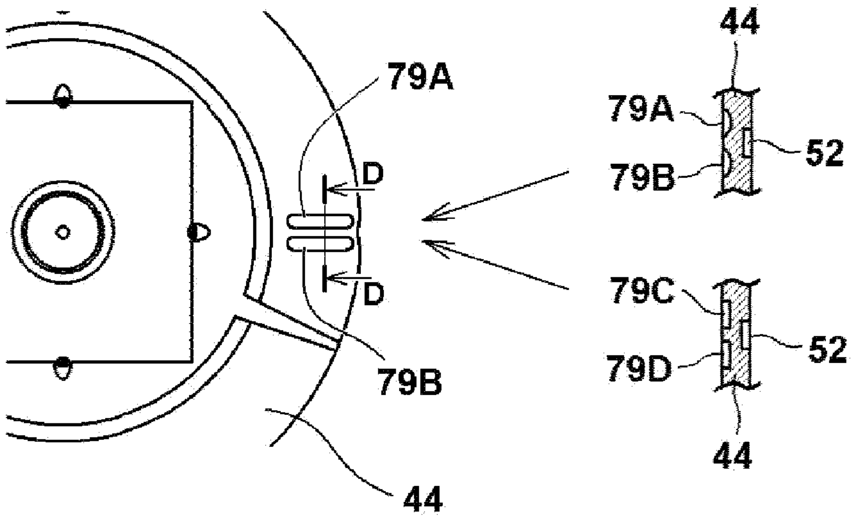

FIG. 10 shows a partial top view and a partial cross-sectional view for illustrating the liquid feeding groove according to the variation example of the embodiment.

Figure 11:
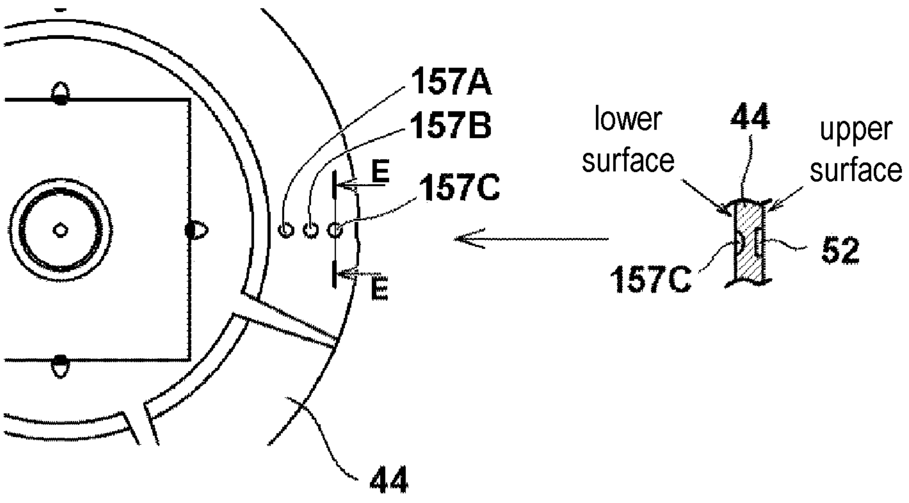
Figure 11:
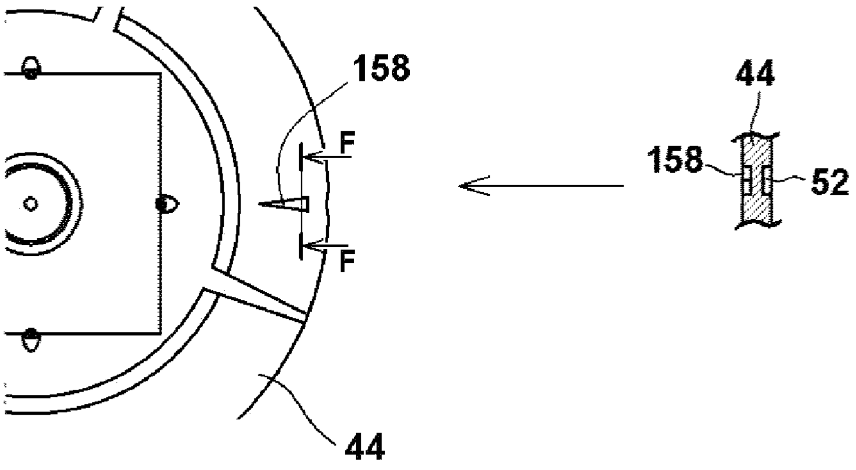

FIG. 11 shows a partial top view and a partial cross-sectional view for illustrating a liquid feeding groove according to a variation example of the embodiment.

Figure 12:
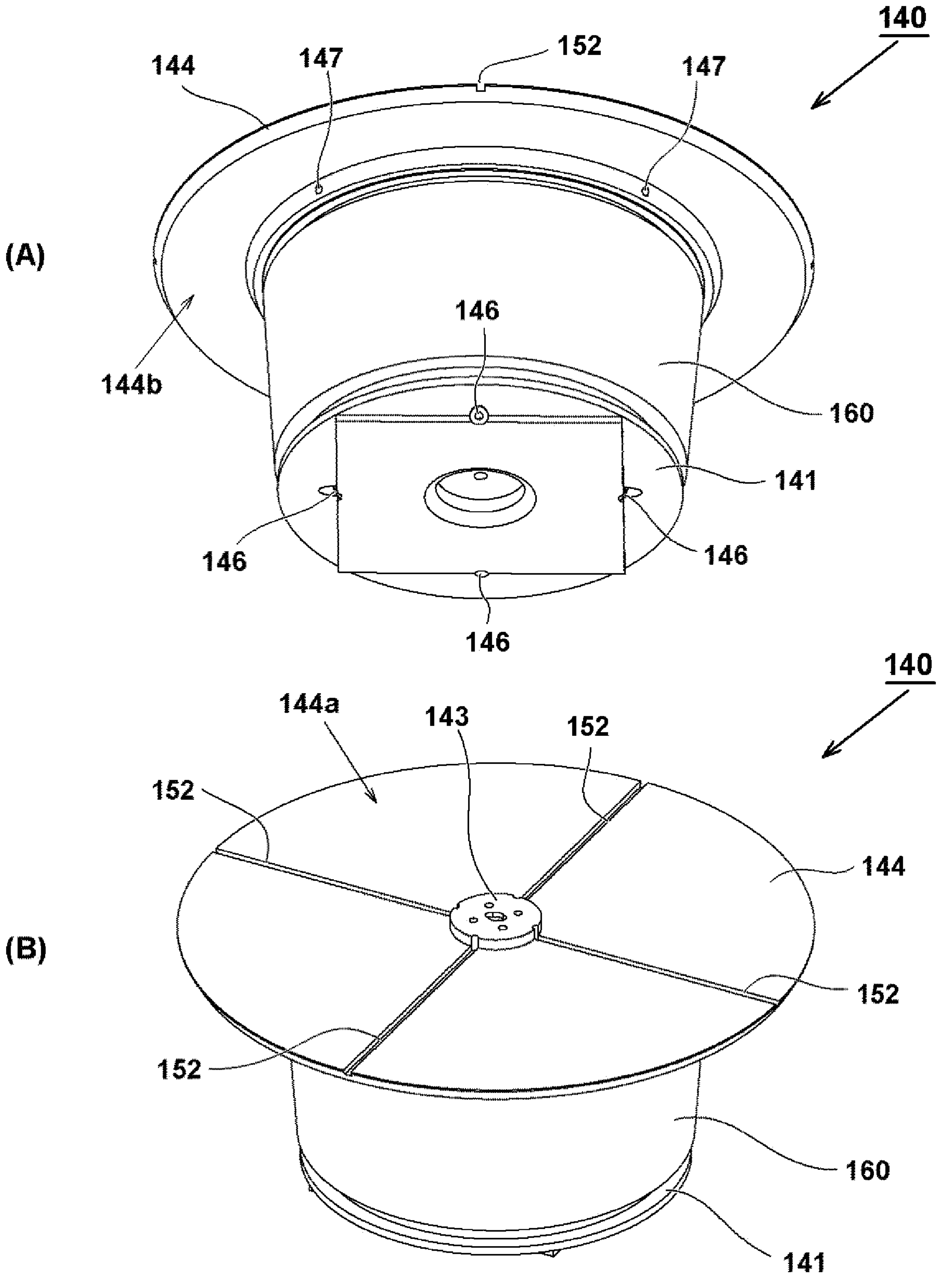

FIG. 12 shows diagrams of a rotor core 140 of a conventional centrifuge, (A) of FIG. 12 is a perspective view of the rotor core 140 when viewed obliquely from below, and (B) of FIG. 12 is a perspective view of the rotor core 140 when viewed obliquely from above.

DESCRIPTION OF THE EMBODIMENTS

Hereinafter, an embodiment of the present invention is described with reference to the drawings. Note that, in the following diagrams, the same parts are designated by the same reference signs, and repeated description is omitted. In addition, in the specification, the directions of up, down, left, and right are described as the directions shown in the diagrams.

Figure 1:
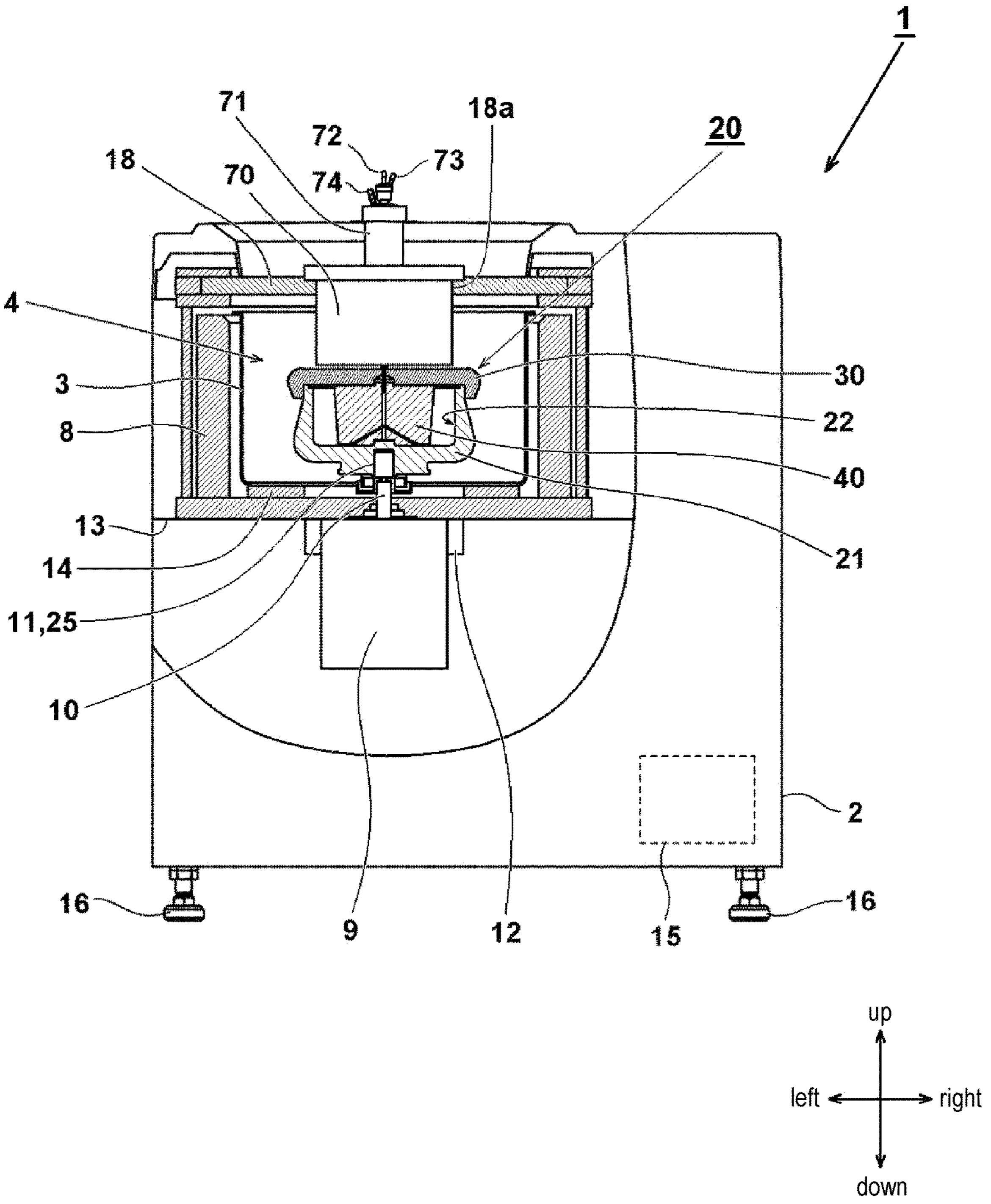
FIG. 1 is an overall configuration diagram of a centrifuge 1 according to an embodiment of the present invention.

FIG. 1 is a cross-sectional view showing an overall structure of a centrifuge 1 according to an embodiment of the present invention. In the centrifuge 1, with respect to the inside of a housing 2 made of a box-shaped sheet metal or the like, an inner space of the housing 2 is divided into an upper chamber and a lower chamber by a partition plate 13, and a bowl 3 formed of a thin metal plate is arranged in the upper chamber. A rotor chamber 4 is defined by closing an opening portion of the bowl 3 by a sliding door 18. A rotor 20 is a so-called rotating body for continuous centrifugal separation which allows putting-in and putting-out of a sample to be separated during rotation, and is mounted on a rotating shaft 10 of a motor 9 serving as a drive device. The motor 9 is fixed to the partition plate 13 that constitutes a portion of the housing 2 via a damper 12. Leg portions 16 are arranged on the lower side of the housing 2.

The bowl 3 is made of a material such as stainless steel, aluminum alloy, copper alloy, or the like, and has a substantially circular cross section in a horizontal direction and a substantially cup-like shape having an opening portion on the upper side. A cooling device 14 for cooling the rotor chamber 4 so as to cool (maintain) the rotor 20 to a set temperature is arranged on a bottom surface of the bowl 3. A metal protector 8 having a thickness of several millimeters to several tens of millimeters is arranged on the outside of the bowl 3.

A crown 11 is arranged at an upper end of the rotating shaft 10 of the motor 9, and a rotating shaft hole 25 of the rotor 20 is mounted in a manner of engaging with the crown 11. A control device 15 for controlling the operation of the motor 9 or the like is arranged inside the housing 2. The control device 15 includes a microprocessor, and rotation of the motor 9, operation of the cooling device 14, and feeding and discharging of a density gradient liquid, a sample, or the like, are controlled by executing a computer program. A display device such as a liquid crystal display (not shown) or the like is arranged on an upper surface of the housing 2.

A door adapter 70 having a seal body accommodated inside is arranged on the upper side of the rotor 20. The door adapter 70 is a member that does not rotate, and a seal attachment including the seal body 71 is supported by a through hole 18*a* of the door 18. A sample inlet/outlet 72, a density gradient liquid inlet 73, and a water outlet 74 of a pipe for cooling water is arranged on the seal body 71. Although not shown here, a tube (not shown) for feeding a sample and discharging the sample and the density gradient liquid is connected to the sample inlet/outlet 72, and a tube for feeding the density gradient liquid is connected to the density gradient liquid inlet 73. The water outlet 74 is connected to a tube (not shown) for circulating cooling water that cools a seal body assembly (not shown).

The rotor 20 accommodates a sample to be separated and separates the sample into layers in the radial direction by being rotationally driven by the motor 9. A rotor body 21 has a bowl shape. A male screw is formed at an upper end portion on the outer periphery of the bowl shape, and the rotating shaft hole 25, which is mounted on the crown 11 fixed to a front end (upper end) of the rotating shaft 10, is formed on a bottom surface. A core (rotor core 40) is arranged on the inner side of a recess 22 that is recessed inward from an upper opening of the rotor body 21, and the opening is closed by a cover 30. The rotor core 40 has a blade 58 (see FIGS. 2 to 4 described later) serving as a partition wall that divides a separation chamber 24 into four portions having a fan shape when viewed from above.

The cover 30 has a female screw that fastens to the male screw of the rotor body 21 and accommodates the sample by closing the open portion of the bowl-shaped rotor body 21 and closes the separation chamber 24 (see FIG. 2 for the reference sign) by the cover 30 and the rotor body 21. The centrifuge 1 according to the embodiment can use not only the so-called rotor 20 for continuous centrifugal separation but also a general angle rotor or a swing rotor. The angle rotor has mounting holes for mounting a plurality of test containers in a circumferential direction. When the angle rotor is mounted on the crown 11, the door adapter 70 shown in FIG. 1 is removed, and the through hole 18*a* of the door 18 is closed.

Figure 2:
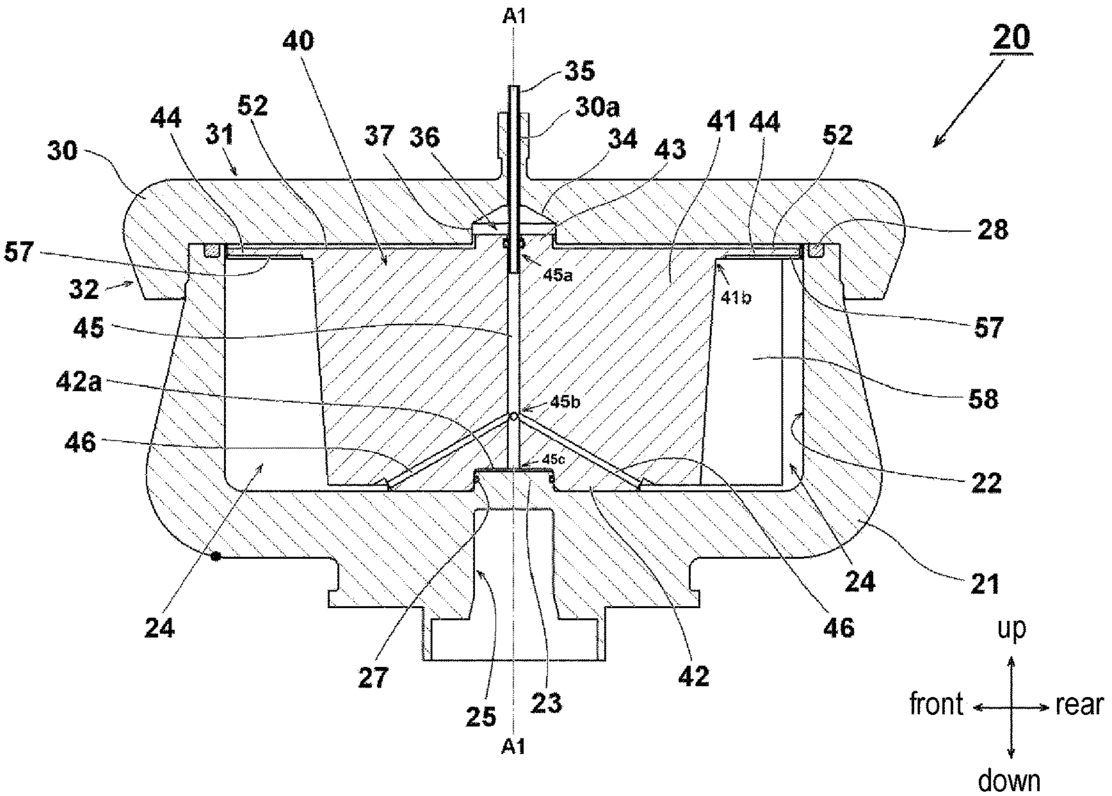
FIG. 2 is an enlarged view of a rotor 20 of FIG. 1.

FIG. 2 is an enlarged view of the rotor 20. The rotor 20 is constituted of the bowl-shaped rotor body 21, the rotor core 40 for guiding the liquid to predetermined radial and axial positions of the separation chamber (accommodation portion) 24 and sucking the liquid from the predetermined radial and axial positions, and the cover 30 that closes the upper opening of the rotor body 21. The rotor body 21 is formed by integrally molding a metal such as titanium alloy or the like. A male screw (not shown) is formed on the outer peripheral portion of the upper opening portion of the rotor body 21, and the rotating shaft hole 25, which is mounted on the crown, is formed on a bottom surface.

The cover 30 is an integral piece of a metal such as titanium alloy or the like, and is constituted of a disc surface 31 that is arranged on the same surface as an opening surface of the rotor body 21 and a cylindrical surface 32 that extends downward from an outer edge portion of the disc surface 31. A female screw fastened to the male screw formed on the rotor body 21 side is formed on the inner peripheral side of the cylindrical surface 32. The cover 30 accommodates the sample by closing the open portion of the bowl-shaped rotor body 21, and the separation chamber 24 is formed in the internal space of the cover 30 and the rotor body 21. In order to improve airtightness, a seal packing 28 is arranged at a joining portion between the cover 30 and the rotor body 21. Furthermore, a through hole 30*a* for a shaft 35 to be inserted in is formed in a central axis portion of the cover 30. The shaft 35 is fixed to the cover 30 by a nut (not shown). A double pipe is formed in which an outer pipe is formed on the outer side of an inner pipe, and a passage is formed in which the inner pipe is connected to a central axis hole 45 of the rotor core 40, and the outer pipe communicates with a reverse funnel-shaped flow path portion 34 having an upside-down funnel shape formed on the lower surface side on the central axis line of the cover 30. The reverse funnel-shaped flow path portion 34 serves as a portion of a passage for feeding and discharging the density gradient liquid, a buffer liquid, or the like.

The rotor core 40 is mainly constituted of a substantially cylindrical solid portion 41 and an annular disc portion 44 extending radially outward in a flange-like shape on the same surface as an upper surface of the solid portion 41. The solid portion 41 and the disc portion 44 are manufactured by integral molding of synthetic resin or metal. The solid portion 41 is not a completely columnar shape, and a diameter of the solid portion 41 is formed in a manner that an outer diameter becomes slightly smaller from the upper side to the lower side. At the center of an upper surface of the rotor core 40, a columnar protrusion 43 protruding upward in a convex shape is formed and engages with a columnar recessed portion (a recess 37) formed in the cover 30. At the center of a lower surface of the rotor core 40, a recess 42*a* that is recessed upward in a convex shape is formed and engages with a protrusion 23 which is formed in the vicinity of the central axis of a bottom surface of the rotor body 21 and protrudes upward. An O-ring 27 is interposed between the recess 42*a* and the protrusion 23 and seals to prevent liquid from leaking from the lower end of a central axis hole 45 indicated by an arrow 45*c* to the lower side of a step portion 42.

A liquid feeding groove (radial groove) 52 which is used for liquid feeding and extends in the radial direction is formed in the upper surface of the rotor core 40. An outer peripheral side end portion of the liquid feeding groove 52 extends to a position substantially reaching the inner wall surface of the recess of the rotor body 21. The liquid feeding groove 52 is formed on an upper surface side of the disc portion 44, and a stress relaxation groove 57 is formed on a lower surface side of the disc portion 44 corresponding to the position of the liquid feeding groove 52.

The central axis hole 45 is formed concentrically with a rotation axis A1 of the rotor core 40. The central axis hole

45 is formed by drilling in a manner of penetrating from a position of an arrow 45*a* on the upper surface of the rotor core 40 to a position of an arrow 45*c* on the lower surface. Furthermore, in the lower surface of the rotor core 40, a radial hole 46 is formed obliquely from the vicinity of a position indicated by an arrow 46*a* to a position indicated by an arrow 45*b* in the middle of the central axis hole 45. A total of four radial holes 46 are formed at equal intervals in a manner of being separated by 90 degrees in the circumferential direction (only two holes can be seen in FIG. 2 due to the cross-sectional position). The radial hole 46 can also be formed by drilling like the central axis hole 45.

Although not visible in the vertical cross-sectional position in FIG. 2 due to different arrangement positions in the circumferential direction, a substantially L-shaped through hole 47 (schematically shown in FIG. 7) that communicates an upper surface of the protrusion 43 to the vicinity of the upper end of the solid portion 41 indicated by an arrow 41*b* is formed in the rotor core 40.

Figure 3:
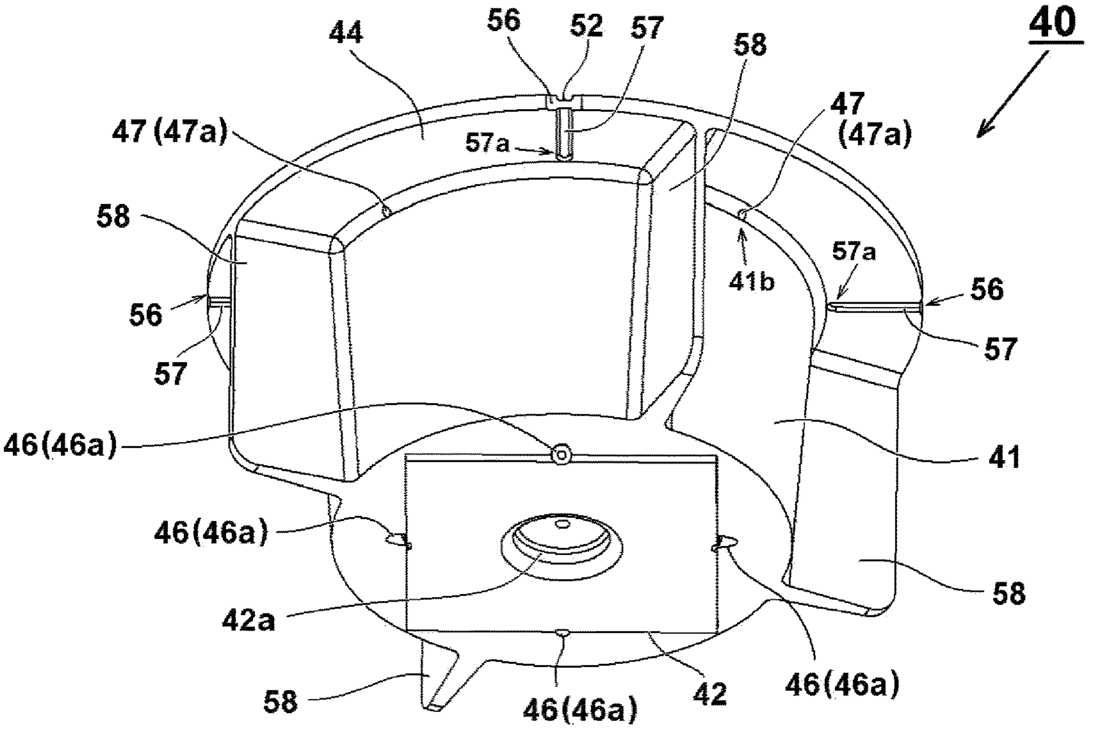
FIG. 3 is a perspective view of a rotor core 40 of FIG. 2 when viewed obliquely from below.

FIG. 3 is a perspective view of the rotor core 40 when viewed obliquely from below. The rotor core 40 is arranged to form a passage of the sample or the density gradient liquid in the rotor body 21, and is manufactured by integrally molding a synthetic resin or metal. The four blades 58 formed on the rotor core 40 are formed to prevent turbulence of the sample and the density gradient liquid in the separation chamber 24 (see FIG. 2). An outlet opening of the liquid feeding groove 52 is exposed at an outer edge portion of the disc portion 44. In order that the liquid delivered from the liquid feeding groove 52 toward the outside in the radial direction effectively flows into the lower space, a recessed portion 56 that is slightly recessed inward in an arc shape is formed in the vicinity of the opening of the liquid feeding groove 52 of the disc portion 44. By forming the recessed portion 56, the flow path is not restricted even if an outer peripheral surface of the disc portion 44 other than the recessed portion 56 is in close contact with an inner peripheral side wall surface of the rotor body 21. An opening 47*a* of a L-shaped hole 47 is located in the vicinity of the upper end of the solid portion 41 as shown by the arrow 41*b*, and positioned directly below the disc portion 44. An opening of the L-shaped hole 47 on the other side opens on the upper surface of the protrusion 43 (see FIG. 2) formed on the central axis on the upper surface of the rotor core 40.

An opening 46*a* of the radial hole 46 that communicates with the central axis hole 45 (see FIG. 2) is formed in a lower surface of the solid portion 41 of the rotor core 40. As shown in the cross-sectional view of FIG. 2, the radial hole 46 is formed obliquely rather than horizontally, and is formed obliquely upward as approaching the rotation axis A1. The liquid does not flow when the four openings 46*a* are in close contact with the bottom surface of the rotor body 21 (see FIG. 2). Thus, the step portion 42 protruding slightly downward is formed on the lower side of the solid portion in a manner of leaving a gap between the outer edge side of a bottom surface of the solid portion 41 and the rotor body 21. By forming the step portion 42 in this way, the sample can smoothly flow in or out of the separation chamber 24 (see FIG. 2) through a first liquid feeding hole using the radial hole 46. Further, the radial hole 46 is the first liquid feeding hole, and the L-shaped hole 47 is a second liquid feeding hole, which are flow paths independent from each other.

Here, the shape of a conventional rotor core 140 is described with reference to FIG. 12. The conventional rotor core 140 has a solid portion 141 and a disc portion 144 extending radially outward from an upper surface of the rotor core 140. In addition, a titanium sleeve 160 made of titanium alloy is mounted on an outer peripheral surface of the solid portion 141. A blade made of synthetic resin (not shown) is mounted on the outer peripheral side of the titanium sleeve 160, and the conventional rotor core 140 has an overall shape the same as that of the rotor core 40 of the embodiment shown in FIG. 3. The titanium sleeve 160 is used for reinforcing the solid portion 141, and is used by being fitted into the solid portion 141. A blade made of synthetic resin (not shown) can be mounted on the outer peripheral side of the titanium sleeve 160. The blade (not shown) has almost the same shape as the blade 58 shown in FIG. 3. A first liquid feeding hole (a radial hole 146) and a second liquid feeding hole (a L-shaped hole 147) that are the same as those shown in FIG. 3 are also formed in the conventional rotor core 140. In addition, four liquid feeding grooves 152 extending in the radial direction are formed in an upper surface 144*a* of the solid portion 141 and the disc portion 144. A protrusion 143 is formed at the center of the upper surface of the solid portion 141, and a shape of the solid portion 141 and positions of holes and grooves formed thereon are the same as those shown in FIGS. 2 and 3. However, as is clear from (A) of FIG. 12, a lower surface 144*b* of the disc portion 144 is flat and does not have any grooves or recesses formed therein.

Returning to FIG. 3 again, the difference between the rotor core 40 and the conventional rotor core 140 shown in FIG. 12 is that the blade 58 is also included in the rotor core 40 and integrally molded with the rotor core 40, and the stress relaxation groove 57 is formed in the lower surface of the disc portion 44. The stress relaxation groove 57 is formed on the lower side of the liquid feeding groove 52 that is formed in the upper surface of the disc portion 44. The stress relaxation groove 57 is arranged in a manner of partially overlapping a position where the liquid feeding groove 52 is formed when viewed in the direction of the axis A1. In addition, the radial outer end portion of the stress relaxation groove 57 opens on the recessed portion 56. At the radial inner end portion of the stress relaxation groove 57, a smooth edge portion is formed in a spherical shape as shown by an arrow 57*a* so as to avoid concentration of stress at a specific inflection point as much as possible.

FIG. 4 is a perspective view of the rotor core 40 when viewed obliquely from above. The upper surface of the rotor core 40 is formed by the upper surface of the solid portion 41 shown by a dotted line and a plane on which the disc portions 44 formed on the outer side in the radial direction are continuous. The upper opening 45*a* of the central axis hole 45 is formed in the vicinity of the axis center on the upper surface of the solid portion 41. The upper opening 45*a* is also an opening portion of the first liquid feeding hole. Four upper openings 47*c* are formed around the upper opening 45*a*. The upper openings 47*c* are located in the upper surface of the protrusion 43, and are formed slightly outward in the radial direction from the rotation axis A1. Further, because the shaft 35 (see FIG. 2) is passed through the upper opening 45*a*, an independent flow path is maintained without being confused with a flow path passing through the upper opening 47*c*.

A passage mainly for supplying the density gradient liquid or the like into the separation chamber is formed by liquid feeding grooves 51 and 52 formed in the upper surface of the rotor core 40. The liquid feeding groove 51 is a groove portion formed from the top to the bottom along the outer peripheral surface of the protrusion 43, and serves as a closed passage when the protrusion 43 abuts on the recess 37 of the cover 30. The liquid feeding groove 52 is a groove portion formed from the inside to the outside in the radial direction along the outer peripheral surface of the protrusion 43, and serves as a closed passage when the upper surface of the rotor core 40 abuts on the inner lower surface of the cover 30. The recessed portion 56 that has been scraped off in a manner of being recessed in an arc shape toward the inner side in the radial direction is arranged at the radial outer end portion of the liquid feeding groove 52, and the liquid that reaches the outer portion in the radial direction through the liquid feeding groove 52 flows toward the separation chamber 24 (see FIG. 2) on the lower side. Four blades 58 connected in a radial shape are formed in an integral shape on the outer peripheral surface of the solid portion 41 of the rotor core 40. These blades 58 separate the interior of the separation chamber 24 (see FIG. 2) into four spaces. As shown in FIG. 3, the opening 46*a* of the radial hole 46 (the first liquid feeding hole) and the opening 47*a* of the L-shaped hole 47 (the second liquid feeding hole) are arranged in each of the four separated spaces.

In the upper surface of the rotor core 40, four holes 49 are arranged at equal intervals in the circumferential direction at the upper end portion of the solid portion 41. These holes 49 are formed to engage a dedicated jig when the rotor core 40 is taken out from the rotor body 21.

FIG. 5 is a partial side view of the disc portion 44 of the rotor core 40 of FIG. 4 when viewed from a B portion. The thickness of the disc portion 44 is T, and a cross-sectional shape of the liquid feeding groove 52 extending from the inside to the outside in the radial direction in the upper surface 44*a* of the disc portion 44 has a semi-oval shape that looks like a half oval. The inner end portion of the liquid feeding groove 52 is connected to the liquid feeding groove 51 extending in the axis line direction. The liquid feeding groove 51 is a groove recessed on the inner peripheral side in the outer peripheral surface of the protrusion 43. In the embodiment, in the lower surface 44*b* of the disc portion 44, the stress relaxation groove 57 extending from the inside to the outside in the radial direction is formed at the circumferential position corresponding to the liquid feeding groove 51 (for example, approximately the same position on the lower surface of the disc portion 44 of the liquid feeding groove 51). The stress relaxation groove 57 also has the same shape as the liquid feeding groove 52, and the cross-sectional shape thereof is a semi-oval shape that looks like a half oval. The stress relaxation groove 57 is a groove that is recessed in a direction approaching the liquid feeding groove 51. It is desirable that a depth $D_1$ of the liquid feeding groove 52 in a plate thickness direction is formed deeper than a depth $D_2$ of the stress relaxation groove. However, the depth $D_1$ of the liquid feeding groove 52 differs depending on various conditions such as shape, hydraulic pressure, and the like, and thus the optimum shape is formed after the strength is sufficiently confirmed. However, it is necessary that the $D_1+D_2$ is sufficiently smaller than the plate thickness T, and a sufficient space remains between the liquid feeding groove 52 and the stress relaxation groove 57. A circumferential width $W_1$ of the liquid feeding groove 52 is formed in a manner of being constant from the inside to the outside in the radial direction. Similarly, a width $W_2$ of the stress relaxation groove differs depending on various conditions such as shape, hydraulic pressure, and the like, and thus the optimum shape is formed after the strength is sufficiently confirmed.

Here, the way of the generation of stress variation due to the presence of the groove portion (the liquid feeding groove 52) is described with reference to (B) and (C) of FIG. 5. (B) of FIG. 5 shows a liquid feeding groove 152 of the conventional rotor core 140 shown in FIG. 12. In the liquid feeding groove 152, a hydraulic pressure is uniformly applied to positions having the same radius by the liquid such as the density gradient liquid, the sample, or the like injected into the rotor core 40. However, because the hydraulic pressure caused by the high speed rotation of the rotor 20 is also applied to the wall surface of the groove portion (the liquid feeding groove 152) in directions of arrows 65*a* and 65*b*, with the corner of the groove portion as a fulcrum, a moment is generated that bends the vicinity of the center of the groove upward in a convex shape as shown by arrows 66*a* and 66*b*. Thus, a force that deforms the liquid feeding groove 152 upward to a convex shape acts during the rotation. Therefore, in the embodiment, as shown in (C) of FIG. 5, by forming a groove portion (the stress relaxation groove 57) also on the lower side of the disc portion 44, a moment that bends the groove portion (the stress relaxation groove 57) downward as shown by dotted arrows 68*a* and 68*b* is generated using the hydraulic pressure that acts on the lower groove portion (the stress relaxation groove 57) as shown by dotted arrows 67*a* and 67*b*, and thereby moments (66*a*, 66*b*) generated by the upper groove and moments (68*a*, 68*b*) generated by the lower groove are mutually canceled to suppress the deformation, and the stress in the upper and lower groove portions is relaxed, which reduces the deformation of the disc portion 44. In this way, by reducing the deformation of the core during the rotation, the effect of material fatigue due to repeated use can be reduced, and the service life of the rotor core 40 can be extended.

Next, the feeding state and the discharge state of the density gradient liquid or the sample during the centrifugal separation operation are described with reference to FIGS. 6 to 8. FIG. 6 is a diagram illustrating a liquid feeding state of the density gradient liquid in a preparatory stage before the sample is injected into the rotor 20. In each of (A) of FIG. 6 to (A) of FIG. 8, the liquid feeding groove 52 and the first liquid feeding hole (the radial hole 46) are shown in large size so that the liquid flow can be seen, the second liquid feeding hole (the L-shaped hole 47) is shown by being shifted to the circumferential position to be visible in the same cross-sectional view, and these figures are schematic views that do not match the actual scale and arrangement. In particular, it should be noted that the shape of the rotor core 40 is shown smaller and the size of each passage is increased.

A step of injecting the sample described. When the operation is started by an operator operating a display panel (not shown), the control device 15 rotates the motor 9 and rotates the rotor 20 at a speed of about 3,000 rpm. At this time, the control device 15 operates the cooling device 14 to cool the temperature inside the rotor chamber 4 to a predetermined temperature. Subsequently, the control device 15 (not shown) uses the outer passage of the double passage penetrating the central axis line of the cover 30 to feed the density gradient liquid as shown by an arrow 81*a*. In (A) of FIG. 6, the signs are only marked on the black arrows on the left side. However, because the rotor is rotationally symmetric, the liquid flows in the same manner in the separation chamber 24 on the right side of the diagram. The density gradient liquid that flows as shown by the arrow 81*a* and reaches a part of a space 36 on the upper surface of the protrusion 43 flows by a centrifugal force along the outer peripheral surface of the reverse funnel-shaped flow path portion 34 which is formed in a funnel shape, and flows into the liquid feeding grooves 51 and 52 as shown by arrows 81*b* to 81*d*. Here, because the rotor 20 is rotating at the speed of 3,000 rpm, the liquid flows on the outer peripheral side by the centrifugal force, and thus the liquid does not flow into the L-shaped hole 47. The liquid that has flowed to the outer edge portion of the liquid feeding groove 52 flows into the separation chamber 24 as shown by arrows 82*a* and 82*b*. In this way, the density gradient liquid is filled in the separation chamber 24, and at this time, layers of liquids having different densities are formed in the separation chamber 24 by switching and flowing the density gradient liquid having different specific gravities. When the inside of the separation chamber 24 is filled with the density gradient liquid, the excess density gradient liquid having a small specific gravity moves as shown by arrows 83*a* to 83*c* and 84*a* to 84*c*, is pushed out to the center side through the radial hole 46 as shown by an arrow 85, and flows through the central axis hole 45 as shown by arrows 86, 86*a* and 86*b* to be discharged to the outside of the rotor 20. In this way, the density gradient liquid required for sample separation is injected from the outside of the rotor 20 by using a liquid feeding pump (not shown) and is discharged from the shaft 35.

Next, a centrifugal separation step is described with reference to FIG. 7. The flow path is switched from the injection state of the density gradient liquid shown in FIG. 6, the rotational speed of the rotor 20 is increased to 32,000 to 35,000 rpm, and as shown by an arrow 87*a*, the sample is fed from the inner side of the shaft 35 by using the liquid feeding pump (not shown). The sample flowing through the central axis hole 45 and the radial hole 46 as shown by arrows 87*a* to 87*c* passes through the gap between the lower surface of the solid portion 41 of the rotor core 40 and the bottom surface of the rotor body 21 as shown by the arrow 87*d* and flows into the separation chamber 24. In the separation chamber 24, the high-density component moves to the outer peripheral side and the low-density component moves to the inner peripheral side by the centrifugal force of the rotor 20 rotated at a high speed. Because the sample flowing as shown by the arrows 87*a* to 87*d* flows continuously, the component having a lighter specific gravity on the inner peripheral side in the separation chamber 24 moves to the inner side from the opening 47*a* of the L-shaped hole 47 as shown by an arrow 87*f*, then is discharged from the upper opening 47*c* formed on the protrusion 43 as shown by an arrow 87*g*, and finally is discharged to the outside from the rotor 20 as shown by an arrow 87*h*. While the sample is continuously flown into the rotor 20 in this way, the operation is performed for a time suitable for the centrifugal separation.

FIG. 8 is a diagram showing a procedure for taking out a separated sample component (a separated sample 90) after the centrifugal separation operation is completed. Here, the rotor 20 is decelerated again to 3,000 rpm. Then, an extrusion liquid having a heavy specific gravity is injected from a sample discharge port as shown by arrows 88*a* to 88*d*. Subsequently, the extrusion liquid is injected into the separation chamber 24 as shown by arrows 88*e*, and makes that the separated sample component (the separated sample 90) to be taken out is extruded from the outer peripheral side, as shown by arrows 90*a* to 90*c*, and further as arrows 91*a* to 91*c*, to the inner peripheral side. The density gradient liquid on the inner peripheral side of the separated sample 90 is discharged to the outside from the shaft 35 as shown by arrows 91*a* to 91*c*, 92, 93*a*, and 93*b*. Furthermore, when the extrusion liquid is injected, the separated sample 90 is discharged following the density gradient liquid on the inner peripheral side, and thus the separated sample 90 is collected. The density gradient liquid containing precipitated particles can be separately collected by a fraction collector while absorbance is measured using a spectrophotometer or the like. In this way, by continuing to flow the extrusion liquid, the separated sample 90 is pushed out from the outside to the inside of the separation chamber 24, and the separated sample 90 is collected through the central axis hole 45 as shown by arrows 93*a* and 93*b*. The above series of steps is performed in a state that the rotor chamber 4 and the atmosphere are sealed.

As described above, in the embodiment, in addition to the liquid feeding groove 52, the stress relaxation groove 57 is formed in the upper surface of the rotor core 40. Thus, the deformation of the rotor core 40 during high speed rotation is reduced, and thereby the risk of fracture during repeated use is reduced and a significant margin can be given to the service life of the rotor core 40.

Next, a variation example of the stress relaxation groove 57 of the embodiment is described with reference to FIGS. 9 to 11. As described in (C) of FIG. 5, the stress relaxation groove 57 is formed to cancel the bending moment caused by the liquid feeding groove 52. Therefore, with respect to the shape and the arranged position of the stress relaxation groove 57, the stress relaxation groove 57 can be formed in various positions and the shape may be various as long as the effect is sufficient. (A) of FIG. 9 shows the shape of the stress relaxation groove 57 of the embodiment, and the stress relaxation groove 57 is formed in a manner of being continuous from the vicinity of a connection portion between the solid portion 41 and the disc portion 44 to the outer edge portion. At this time, the right portion shows the variation in the cross-sectional shape of the liquid feeding groove 52 and the stress relaxation groove. The topmost side view shows the cross-sectional shape of the stress relaxation groove 57 described in FIGS. 3 to 8. Further, the cross-sectional openings of the liquid feeding groove 52 and the stress relaxation groove 57 shown on the right side of FIG. 9 are rectangular, but actually, the corners in the grooves may be rounded as shown in (A) of FIG. 5. With regard to the side surface shape shown on the upper right side of (A) of FIG. 9, the width (length in the circumferential direction) of the liquid feeding groove 52 is the same as that of the stress relaxation groove 57.

With regard to the side surface shape shown at the middle right side of (A) of FIG. 9, the width of a stress relaxation groove 77*a* is about 50% smaller than the width of the liquid feeding groove 52. With regard to the side surface shape shown on the lower right side of (A) of FIG. 9, the width of a stress relaxation groove 77*b* is about 50% larger than the width of the liquid feeding groove 52. In this way, the shapes of the stress relaxation grooves 57, 77*a*, and 77*b* may be changed as long as the effect of stress reduction can be obtained.

In (B) of FIG. 9, radial lengths of stress relaxation grooves 77 (77*c* to 77*e*) are the same as those of the stress relaxation grooves 57, 77*a*, and 77*b* in (A) of FIG. 9, and the stress relaxation grooves 77 are formed to have a side surface and a cross section of an arc shape instead of a substantially rectangular shape. Three shapes of the stress relaxation grooves 77*c* to 77*e* are shown on the right side of (B) of FIG. 9. However, even the shape of the cross section of the stress relaxation grooves 77*c* to 77*e* orthogonal to the longitudinal direction is formed in an arc shape in this way, the effect of stress reduction can be obtained.

(C) of FIG. 9 shows that the radial length of a stress relaxation groove 78 is shorter than that of the stress relaxation groove 78 of (B) of FIG. 9. At this time, the inner position indicated by an arrow 78*a* is shifted outward without changing the radial outer position of the stress relaxation groove 78. As shown on the right side of (C) of FIG. 9, the shape of the cross section of the stress relaxation groove 78 orthogonal to the longitudinal direction is formed in an arc shape, but the shapes shown in (A) of FIG. 9 and (B) of FIG. 9 may also be adopted.

(A) of FIG. 10 shows that the position of a stress relaxation groove 79 on the outer side in the radial direction is not extended to the position on the outer edge of the disc portion 44, but is located slightly inside the outer edge as shown by an arrow 79*b*. As shown by an arrow 79*a*, the position of the stress relaxation groove 79 on the inner peripheral side is the same as that of the stress relaxation groove 57 shown in FIGS. 3 to 5. Here, as shown on the right side of (A) of FIG. 10, the cross-sectional shape of the stress relaxation groove 79 in a C-C cross section is formed in an arc shape, but various cross-sectional shapes as shown in FIGS. 8 and 9 may also be adopted.

(B) of FIG. 10 shows that two stress relaxation grooves 79 shown in (A) of FIG. 10 are arranged at intervals in a manner of being adjacent to each other in the circumferential direction. The position of each of the stress relaxation grooves 79A and 79B on the inner peripheral side is almost the same as that of the stress relaxation groove 57 shown in FIGS. 3 to 5, and the position of each of the stress relaxation grooves 79A and 79B on the outer peripheral side is almost the same as that of the stress relaxation groove 79 shown in (A) of FIG. 10. As shown by the two cross-sectional shapes of a D-D portion on the right side, the cross-sectional shapes of the stress relaxation grooves 79A and 79B may be an arc shape or a substantially rectangular shape like the stress relaxation grooves 79C and 79D.

FIG. 11 shows a further variation example of a stress relaxation groove. In (A) of FIG. 11, three hemispherical recesses 157A to 157C are formed instead of the groove. As shown on the right side of (A) of FIG. 11, the cross-sectional shape of the recess 157C in an E-E cross section is formed in a semicircular shape. The positions where these recesses 157A to 157C are formed are arranged in a manner of completely or partially overlapping the liquid feeding groove 52 when seen through in the direction of the axis A1.

In (A) of FIG. 11, a plurality of stress relaxation grooves are formed in a manner of being intermittent in the radial direction, but in (B) of FIG. 11, the stress relaxation groove is formed in a manner that a width thereof (length in the circumferential direction) changes according to the radial position. That is, when the disc portion 44 is viewed from the bottom surface side, a stress relaxation groove 158 is formed in a triangular shape that is wedge-shaped. The cross-sectional shape in an F-F cross section is as shown on the right side of (B) of FIG. 11. Moreover, the cross-sectional shape of the stress relaxation groove 158 may be formed in an arc shape in which the corners are formed by a smooth curved surface, instead of being formed in a substantially rectangular shape that has corners.

The rotor core 40 of the embodiment and various variation examples of the stress relaxation groove have been described above, but the shape of the rotor core 40 is not limited to the shapes in the above embodiment, and the same effect as that in the embodiment can be obtained as long as the rotor core 40 has some kind of recess formed on the lower surface of the disc portion 44. In addition, the rotor core 40 may be made of metal instead of synthetic resin material.

What is claimed is:

1. A rotor for centrifuge which is rotated by a driving source, comprising: a rotor body that has a recess formed inside; a rotor core arranged in the recess; and a rotor cover for closing an opening of the rotor body,
wherein the rotor core comprises:
a columnar solid portion; a disc portion extending radially outward from an upper surface of the solid portion;
a liquid feeding groove located on an upper surface of the rotor core and formed in a manner of being continuous from the solid portion to the disc portion; and
a liquid feeding hole formed in a manner of extending downward from the upper surface of the solid portion and further extend in a radial direction, and
a stress relaxation groove is formed on a lower surface of the disc portion.

2. The rotor for centrifuge according to claim 1, wherein the rotor core is an integral piece made of resin or metal, an opening portion of the liquid feeding groove is closed by contacting an inner wall of the rotor cover, and
when the disc portion is viewed in an axis line direction, the stress relaxation groove is arranged at a position that partially overlaps the position of the liquid feeding groove.

3. The rotor for centrifuge according to claim 2, wherein the stress relaxation groove is a groove extending in a radial direction from an inner peripheral side to an outer peripheral side on the lower surface of the disc portion, and an end portion on the outer peripheral side reaches an outer edge portion of the disc portion.

4. The rotor for centrifuge according to claim 3, wherein a plurality of the liquid feeding grooves are formed at equal intervals in a circumferential direction, and
a plurality of the stress relaxation grooves are formed on the lower surface of the disc portion corresponding respectively to the plurality of liquid feeding grooves.

5. The rotor for centrifuge according to claim 4, wherein each of the plurality of the liquid feeding grooves has a U-shaped cross section orthogonal to the extending direction, and
each of the plurality of the stress relaxation grooves has a rectangular, U-shaped, or V-shaped cross section orthogonal to the extending direction.

6. The rotor for centrifuge according to claim 5,
wherein a depth $D_2$ of each of the plurality of the stress relaxation grooves satisfies $D_1+D_2<T$, in which a thickness of the disc portion is T, and a depth of each of the plurality of the liquid feeding grooves is $D_1$.

7. The rotor for centrifuge according to claim 6, wherein the plurality of the stress relaxation grooves are formed in a distributed manner in the circumferential direction or the radial direction with respect to each of the liquid feeding grooves, respectively.

8. The rotor for centrifuge according to claim 1, wherein a blade extending radially outward from an outer peripheral surface of the solid portion is further arranged, the blade has a vertical plate shape connected to the disc portion, and
the disc portion, the solid portion, and the blade are integrally formed.

9. The rotor for centrifuge according to claim 8, wherein a columnar protrusion protruding axially upward is formed at an axial center of the upper surface of the solid portion, and
the liquid feeding groove is constituted of an axial groove portions extending downward on an outer peripheral surface of the protrusion and four radial groove portions extending radially outward with respect to the solid portion from a lower end of the axial groove portion.

10. The rotor for centrifuge according to claim 9, wherein the liquid feeding hole comprises:
a first liquid feeding hole that has an upper opening at an axial center of an upper surface of the protrusion, extends downward in the axis line direction and outward in the radial direction in the middle, and opens in the vicinity of the lower surface of the disc portion on the outer peripheral surface of the solid portion; and a second liquid feeding hole that has an opening at a position adjacent to the outer side in the radial direction from the upper opening of the first liquid feeding hole, extends downward in the axis line direction and outward in the radial direction in the middle, and has an opening on the outer peripheral surface of the solid portion.

11. A centrifuge, comprising:

the rotor for centrifuge according to claim 1;

a door adapter that is mounted on the rotor cover and has a through hole through which a flow path that supplies and discharges a liquid to and from the recess passes;

a bowl that defines a rotor chamber in which the rotor for centrifuge rotates; and a housing for holding the driving source and the bowl.

12. A centrifuge, comprising:

the rotor for centrifuge according to claim 2;

a door adapter that is mounted on the rotor cover and has a through hole through which a flow path that supplies and discharges a liquid to and from the recess passes;

a bowl that defines a rotor chamber in which the rotor for centrifuge rotates; and a housing for holding the driving source and the bowl.

13. A centrifuge, comprising:

the rotor for centrifuge according to claim 3;

a door adapter that is mounted on the rotor cover and has a through hole through which a flow path that supplies and discharges a liquid to and from the recess passes;

a bowl that defines a rotor chamber in which the rotor for centrifuge rotates; and a housing for holding the driving source and the bowl.

14. A centrifuge, comprising:

the rotor for centrifuge according to claim 4;

a door adapter that is mounted on the rotor cover and has a through hole through which a flow path that supplies and discharges a liquid to and from the recess passes;

a bowl that defines a rotor chamber in which the rotor for centrifuge rotates; and a housing for holding the driving source and the bowl.

15. A centrifuge, comprising:

the rotor for centrifuge according to claim 5;

a door adapter that is mounted on the rotor cover and has a through hole through which a flow path that supplies and discharges a liquid to and from the recess passes;

a bowl that defines a rotor chamber in which the rotor for centrifuge rotates; and a housing for holding the driving source and the bowl.

16. A centrifuge, comprising:

the rotor for centrifuge according to claim 6;

a door adapter that is mounted on the rotor cover and has a through hole through which a flow path that supplies and discharges a liquid to and from the recess passes;

a bowl that defines a rotor chamber in which the rotor for centrifuge rotates; and a housing for holding the driving source and the bowl.

17. A centrifuge, comprising:

the rotor for centrifuge according to claim 7;

a door adapter that is mounted on the rotor cover and has a through hole through which a flow path that supplies and discharges a liquid to and from the recess passes;

a bowl that defines a rotor chamber in which the rotor for centrifuge rotates; and a housing for holding the driving source and the bowl.

18. A centrifuge, comprising:

the rotor for centrifuge according to claim 8;

a door adapter that is mounted on the rotor cover and has a through hole through which a flow path that supplies and discharges a liquid to and from the recess passes;

a bowl that defines a rotor chamber in which the rotor for centrifuge rotates; and a housing for holding the driving source and the bowl.

19. A centrifuge, comprising:

the rotor for centrifuge according to claim 9;

a door adapter that is mounted on the rotor cover and has a through hole through which a flow path that supplies and discharges a liquid to and from the recess passes;

a bowl that defines a rotor chamber in which the rotor for centrifuge rotates; and a housing for holding the driving source and the bowl.

20. A centrifuge, comprising:

the rotor for centrifuge according to claim 10;

a door adapter that is mounted on the rotor cover and has a through hole through which a flow path that supplies and discharges a liquid to and from the recess passes;

a bowl that defines a rotor chamber in which the rotor for centrifuge rotates; and a housing for holding the driving source and the bowl.

* * * * *